(12) United States Patent
Kentley-Klay (10) Patent No.: US 11,099,561 B1
(45) Date of Patent: Aug. 24, 2021

(54) CONTROL OF AN AUTONOMOUS VEHICLE IN UNMAPPED REGIONS

(71) Applicant: Zoox, Inc., Foster City, CA (US)

(72) Inventor: Timothy David Kentley-Klay, Stanford, CA (US)

(73) Assignee: Zoox, Inc., Foster City, CA (US)

( * ) Notice: Subject to any disclaimer, the term of this patent is extended or adjusted under 35 U.S.C. 154(b) by 174 days.

(21) Appl. No.: 16/012,477

(22) Filed: Jun. 19, 2018

(51) Int. Cl.
| | |
|---|---|
| *G05D 1/00* | (2006.01) |
| *B60W 50/08* | (2020.01) |
| *G01C 21/32* | (2006.01) |
| *G06F 16/29* | (2019.01) |
| *B60W 50/00* | (2006.01) |

(52) U.S. Cl.
CPC ......... *G05D 1/0088* (2013.01); *B60W 50/082* (2013.01); *G01C 21/32* (2013.01); *G05D 1/0038* (2013.01); *G05D 1/0061* (2013.01); *G06F 16/29* (2019.01); *B60W 2050/0072* (2013.01); *B60W 2420/42* (2013.01); *B60W 2420/52* (2013.01); *G05D 2201/0213* (2013.01)

(58) Field of Classification Search
CPC .. G05D 1/0088; G05D 1/0038; G05D 1/0061; G05D 2201/0213; G06F 16/29; B60W 50/082; B60W 2420/42; B60W 2420/52; B60W 2050/0072; G01C 21/32
See application file for complete search history.

(56) References Cited

U.S. PATENT DOCUMENTS

| | | | |
|---|---|---|---|
| 8,676,430 B1* | 3/2014 | Ferguson | G05D 1/0274 701/25 |
| 2019/0353486 A1* | 11/2019 | Beaurepaire | G01C 21/32 |

* cited by examiner

*Primary Examiner* — Yuen Wong
(74) *Attorney, Agent, or Firm* — Lee & Hayes, P.C.

(57) ABSTRACT

Autonomous vehicles use accurate maps for navigation. Manually controlling such an autonomous vehicle in certain areas may expand regions the vehicle may service. Such manual control may also be more efficient, safer, and/or reliable, in some instances. Aspects of this disclosure describe techniques for manual control of an autonomous vehicle in unmapped regions. For example, a vehicle may determine and autonomously travel to a mapped location proximate an unmapped destination, and may then be manually controlled from the mapped location to the unmapped destination. In addition, during manual control through the unmapped region, data may be collected using sensors on the autonomous vehicle to map the region.

9 Claims, 5 Drawing Sheets

CONTROL OF AN AUTONOMOUS VEHICLE IN UNMAPPED REGIONS

BACKGROUND

Vehicles are increasingly supplementing or replacing manual functionality with automatic controls. Semi-autonomous vehicles may assist a driver with some functionalities, e.g., collision avoidance and braking, while fully-autonomous vehicles may reduce all passengers to passive participants as they are shuttled to their destination. Often, this increased automation requires a detailed understanding of an environment of the vehicle, e.g., in the form of detailed maps. For unmapped regions, however, navigating the vehicle may be more difficult particularly when conventional controls, like a steering wheel, are not included in the vehicle.

DETAILED DESCRIPTION

The following detailed description is directed to systems and processes for controlling an autonomous vehicle in an environment. Unlike conventional automobiles, some autonomous vehicles may not have onboard navigation controls, e.g., steering wheels, transmission controls, acceleration controls, and/or braking controls, that readily allow for manual control. However, there may be instances in which it is desirable to navigate the vehicle manually or in an on-demand manner. For example, the techniques described herein can be used to allow for manual or remote-control of an autonomous vehicle in unmapped regions, such as on private property.

In the context of a ride-hailing service using autonomous vehicles, the techniques described herein may allow for better service to riders. While autonomous vehicles are becoming increasingly proficient at travelling to locations in mapped regions, autonomous travel in unmapped regions is more difficult. Thus, riders in autonomous vehicles may have to make themselves available for pickup, or accept drop-off, at certain mapped locations, e.g., roadside locations. However, this may be suboptimal when a destination is in a private neighborhood, or at the end of a lengthy driveway. According to implementations of this disclosure, improvements may be obtained by allowing for manual control of the autonomous vehicle in these unmapped regions.

In some examples, an autonomous vehicle may receive instructions to proceed to a destination, e.g., to drop off a passenger or to pick up a passenger-in-waiting. When the destination is in a mapped region, the autonomous vehicle may travel to the destination, as instructed, using conventional autonomous driving techniques. When the destination is in an unmapped region, however, the vehicle may determine an intermediate location in the mapped region and proximate the destination, and the vehicle may then travel autonomously to that intermediate location. For example, when the destination is in a private neighborhood, the vehicle may travel autonomously to an entrance to the neighborhood, or when the destination is at the top of a private driveway, the vehicle may travel autonomously to a bottom of the driveway, e.g., at the street.

Once at the intermediate location, the vehicle may then cease to operate in an autonomous manner, and cede control to a remote or manual controller. For example, upon arriving at the intermediate location, the vehicle may prompt a passenger, a passenger-in-waiting at the destination, a tele-operations system, or some other remote control source to input manual controls for the vehicle. The vehicle may thus proceed from the intermediate location to the destination in the unmapped region according to the manual controls.

According to some implementations of this disclosure, the manual controlling of the vehicle may require less sensor data, and thus only a subset of all of the sensors on the autonomous vehicle may be used when the vehicle is operated manually. By way of non-limiting example, when manually controlled, sensors may be used only to detect objects in the environment, but not to determine advanced controls, such as trajectories, routes, and predicted actions of those objects. Thus, for example, only a single type of sensor, e.g., a time-of-flight sensor, may be enabled for use in vehicle motion while the vehicle is being manually controlled. In at least some examples, one or more sensors and/or sensor types may continue to collect sensor data, and that sensor data may be used to update map data. For example, sensor data may be captured as the vehicle is controlled manually in the unmapped region, and the sensor data may be used subsequently to generate a map of the unmapped region. For instance, although certain types of data, e.g., LiDAR and some types of vision data, may not be necessary to navigate manually in an unmapped region, implementations of this disclosure may still capture such data. Moreover, such data may be used to generate a map of the unmapped region. By way of non-limiting example, some implementations may use LiDAR data to provide information about three-dimensional objects in the environment and vision data to determine object types. Thus, for example, vision data may be used to identify a building in the unmapped region, and LiDAR data may be used to locate the building. In this manner, map data may be updated to include information about the building in the previously-unmapped region. Such an example may improve the functioning of a computer by reducing the amount of processing necessary for mapping a region while controlling the vehicle.

According to some implementations of this disclosure, techniques described herein may also promote safety when the vehicle is manually controlled. For example, while the vehicle may be configured to receive command signals indicating a direction and/or speed at which the vehicle should proceed in the unmapped region, techniques described herein may alter and/or ignore those command signals when unsafe conditions may result. In some examples, the vehicle may determine presence of an object proximate the vehicle, and depending upon the distance and/or position of the object relative to the vehicle, the vehicle may be controlled according to the command signals, i.e., to proceed in the direction at the speed, or according to alternative command signals, e.g., to proceed at a slower speed than the commanded speed or to ignore the command signals altogether. The alternative command signals may be used to prevent inadvertent contact of the vehicle with the object, for example.

The techniques discussed herein can improve functioning of an autonomous vehicle in a number of ways. For example, the techniques discussed herein may facilitate travel in unmapped region and may facilitate mapping of those unmapped regions. Moreover, allowing for manual control of the vehicle in unmapped regions can reduce congestion and delay by allowing for pickup and drop-off at locations other than roadside locations, which may not leave sufficient room for other traffic. These and other improvements to the functioning of the autonomous vehicle and/or to the user experience are discussed herein.

The techniques described herein can be implemented in a number of ways. Example implementations are provided below with reference to the FIGS. 1-4. Although discussed in the context of an autonomous vehicle, the methods, apparatuses, and systems described herein can be applied to a variety of systems, and is not limited to autonomous vehicles. In another example, the techniques can be utilized in an aviation or nautical context.

Figure 1:
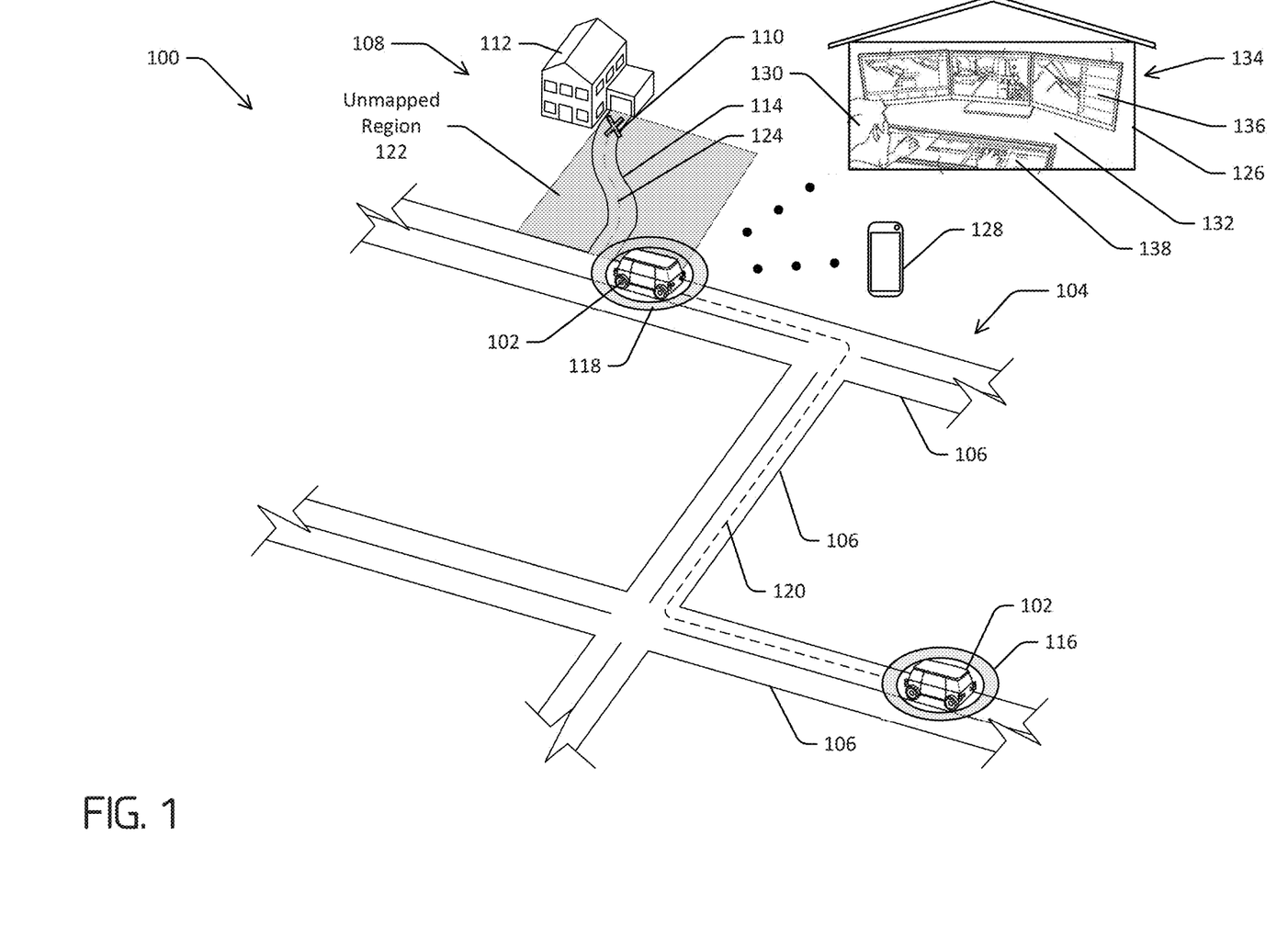
FIG. 1 illustrates an example of control of an autonomous vehicle in unmapped regions according to aspects of this disclosure.

FIG. 1 is a schematic diagram of an example environment 100 through which an example vehicle 102 travels. For the purpose of illustration, the vehicle 102 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In that case, since the vehicle 102 may be configured to control all functions from start to completion of the trip, including all parking functions, it may not include a driver. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The example environment 100 includes a road network 104 including a plurality of example roads 106. The example roads are illustrated as having two lanes, separated by a median or double-yellow line. In some examples, the roads 106 may be one-way roads, or each of the two lanes may be designated for travel in an opposite direction. The roads 106 are examples only, and may include more or fewer lanes. Moreover, the roads may have conventional features, including but not limited to lane dividing lines and lane boundary lines. The example roads 106 may also include shoulders located on opposite sides of the road 106. The road network 104 provides a number of roads 106 through the environment 100, a limited number of which are illustrated. Moreover, and although not illustrated, the road network 104 may include a number of features, such as curves, intersections with cross-roads, crosswalks, traffic signs, traffic lights, railroad crossings, traffic circles, directional arrows, etc.

FIG. 1 also shows an example geographic location 108 associated with a destination 110 and including a structure 112, such as a house or building. As illustrated, the structure 112 may be distanced from the road 106, and the example geographic location 108 may include a driveway 114 extending from the road 106 to the structure 112. In the example of FIG. 1, the autonomous vehicle 102 has received an instruction or command to proceed from a current or origination location 116 to the destination 110 proximate the building 112. However, because the requested destination 110 is not at a roadside location, but at a position spaced from the road, e.g., at a portion of the driveway 114 proximate the structure 112, autonomous control may not be available or practical. Thus, while the vehicle 102 may readily travel to a second location 118, which is a roadside location associated with the geographic location 108, e.g., along a drive path 120, the vehicle 102 may not have sufficient information to traverse to the ultimate destination 110. For instance, the geographic location 108 may include an unmapped region 122, and without sufficient map data, the autonomous vehicle may be unable to navigate from the second location 118 to the ultimate destination 110.

According to implementations of this disclosure, the vehicle 102 may be manually controlled from the second location 118 to the destination 110, e.g., along a path 124 on the driveway 114. For example, upon arriving at the second location 118 proximate the unmapped region 122, the vehicle may receive control signals from a teleoperator system 126 and/or via a user device 128, in addition to any input controls accessible via the vehicle (e.g. touch panels, joysticks, remotes, etc.). For example, due to the insufficient information associated with the unmapped region 122, the vehicle 102 may request remote assistance from the teleoperations system 126 upon approaching the second location 118. Alternatively, a user, such as a passenger in the vehicle 102 or a passenger-in-waiting, e.g., at the destination 110, may be prompted to assist the vehicle 102 to navigate in the unmapped region 122.

In some examples, for example as shown in FIG. 1, the teleoperations system 126 may include one or more teleoperators 130, which may be human teleoperators located at a teleoperations center 132. In some examples, one or more of the teleoperators 130 may not be human. For example, they may be computer systems leveraging artificial intelligence, machine learning, and/or other decision making strategies. In any such configuration, such teleoperations systems 126 may receive a request for guidance from the vehicle 102, in at least some examples. The vehicle 102 may transmit at least a portion of sensor data from the one or more sensors to the teleoperator system 126, though any other combination of sensor data available to the vehicle 102 is contemplated. As a non-limiting example, the vehicle 102 may only transmit time-of-flight data to the teleoperator system 126. In such an example, the amount of sensor data required to be sent to the teleoperator system 126 is limited to only that sensor data which is necessary or helpful, reducing the bandwidth required and processing required to interpret the sensor data.

In the example shown, the teleoperator 130 may interact with the vehicle 102 and/or other vehicles, such as in a fleet of vehicles, for example, via a teleoperator interface 134. The teleoperator interface 134 may include one or more displays 136 configured to provide the teleoperator 130 with data related to operation of the vehicle 102, a subset of the fleet of vehicles, and/or the fleet of vehicles. For example, the display(s) 136 may be configured to show data related to sensor signals received from the vehicles 102, data related to the road network 104, and/or additional data or information to facilitate providing manual control of the vehicle 102. In addition, the teleoperator interface 134 may also include a teleoperator input device 138 configured to allow the teleoperator 130 to provide information to one or more of the vehicles 102, for example, in the form of teleoperations signals providing maneuvering commands to the vehicles 102. The teleoperator input device 138 may include one or more of a touch-sensitive screen, a stylus, a mouse, a dial, a keypad, and/or a gesture-input system configured to translate gestures performed by the teleoperator 130 into input commands for the teleoperator interface 134. As explained in more detail herein, the teleoperations system 138 may provide the vehicle 102 with guidance to navigate through unmapped region 122.

In other implementations, manual controls for navigating through the unmapped region 122 may be received from an electronic device, which may be configured as a user interface in the vehicle 102 (or accessible via the vehicle 102) or which may be the user device 128 configured to act as a remote controller. The electronic device may be connected to or in communication with the autonomous vehicle, e.g., via a wired or wireless connection, such that a person may manipulate controls on the device to control the autonomous vehicle 102. In some examples, the device may have an associated receiver (not shown) that is operably connected to the vehicle 102, e.g., via insertion into a port or other receptacle. Once inserted, the receiver is configured to receive command signals from the remote controller, e.g., wired or wirelessly, at the vehicle 102. In other embodiments, the receiving capabilities may be incorporated into the vehicle, however, and the remote controller may be paired or otherwise operably connected to the vehicle via a wireless protocol, such as Bluetooth® or the like. In examples of this disclosure, the device may be configured to receive user inputs to control acceleration, braking and/or steering of the autonomous vehicle. To receive such user inputs, the device may include buttons, switches, touch screens, microphones, or any other conventional input mechanism. Signals associated with the user inputs are then sent to the autonomous vehicle, e.g., to a receiver at the autonomous vehicle, and the signals are interpreted by and used at the vehicle to move the vehicle in accordance with the inputs.

The example vehicle 102 shown in FIG. 1 is an automobile having four wheels and respective tires for each of the wheels. Other types and configurations of vehicles are contemplated, such as, for example, vans, sport utility vehicles, cross-over vehicles, trucks, buses, agricultural vehicles, and construction vehicles. The vehicle 102 may be powered by one or more internal combustion engines, one or more electric motors, hydrogen power, any combination thereof, and/or any other suitable power sources. In addition, although the example vehicle 102 has four wheels, the systems and methods described herein may be incorporated into vehicles having fewer or a greater number of wheels, tires, and/or tracks. The example vehicle 102 has four-wheel steering and may operate generally with equal performance characteristics in all directions, for example, such that a first end of the vehicle 102 is a front end of the vehicle 102 when travelling in a first direction, and such that the first end becomes the rear end of the vehicle 102 when traveling in the opposite, second direction. Similarly, a second end of the vehicle 102 is a front end of the vehicle 102 when travelling in the second direction, and such that the second end becomes the rear end of the vehicle 102 when traveling in the opposite, first direction. Such a configuration may be referred to herein as "bidirectionality." These example bidirectional characteristics may facilitate greater maneuverability, for example, in small spaces or crowded environments, such as parking lots and urban areas. In the example of FIG. 1, bidirectionality may allow the vehicle 102 to advance from the road 106 toward the structure 110, e.g., on the driveway 112, and then return to the road 106 without turning around.

The vehicle 102 may also include a number of vehicle sensors that sense objects proximate the vehicle, such as in the environment 100. In some examples, the vehicle sensors may include sensors configured to identify objects in the environment 100. The vehicle sensors may include, for example, one or more light detection and ranging sensors (LiDAR), one or more cameras, one or more radio detection and ranging sensors (RADAR), one or more ultrasonic transducers, one or more microphones for sensing sounds in the environment, and other sensors capable of sensing objects. The autonomous vehicle 102 may also include other sensors for other purposes, including but not limited to a speed sensor, sensors related to operation of internal combustion engines and/or electric motors, sensors related to the tires to detect tire temperature, tire pressure, and tread depth, and/or brake-related sensors for detecting brake temperatures and/or wear, and in vehicles having regenerative braking, sensors for detecting parameters related to operation of the regenerative braking system. The vehicle sensors may also include, for example, inertial measurement units (IMUs), accelerometers, and gyroscopes. The vehicle sensors may be configured to provide sensor data representative of the sensed objects to systems associated with the autonomous vehicle 102. Other types of sensors and sensor data are contemplated.

In some implementations, information from the sensors may be used by a perception system associated with the autonomous vehicle 102 to understand attributes of the environment and/or to act on those attributes. In the example shown in FIG. 1, the vehicle 102 may use the one or more sensors, one or more vehicle computing devices, one or more drive modules, and maps to autonomously operate through the environment 100 along the path 120 via the road network 104, as explained in more detail herein. In some examples, the vehicle computing device(s) may be configured to determine a drive envelope defined by virtual boundaries within which the vehicle 102 may travel safely, e.g., without hitting objects in the environment and/or in accordance with applicable traffic laws. The vehicle computing device(s) may also determine one or more trajectories within the drive envelope, and control the drive module(s) to execute those trajectories. In some examples, the vehicle 102 may travel along a drive line within the drive envelope.

However, and as described herein, normal operational controls of the vehicle may not always be available and or may not be practical. For instance, the perception system that navigates the vehicle around an object may be reliant upon one or more stored maps of an area, and when the autonomous vehicle is in an unmapped region or maps are otherwise unavailable, the autonomous vehicle 102 may be unable to properly navigate. Accordingly, and as described in implementations of this disclosure, it may be beneficial to allow for manual control of the autonomous vehicle 102. Similarly, certain environments may be better navigated using manual control. By way of non-limiting example, moving the autonomous vehicle in private locales, e.g., private roads, private property, or in congested places, such as parking lots and parking garages, may benefit from implementations of this disclosure. In addition, while navigating the autonomous vehicle 102 with manual control, a subset of sensor systems 206 may be used to map the unmapped region 122, thereby alleviating or reducing the need for manual control in that area in the future.

Figure 2:
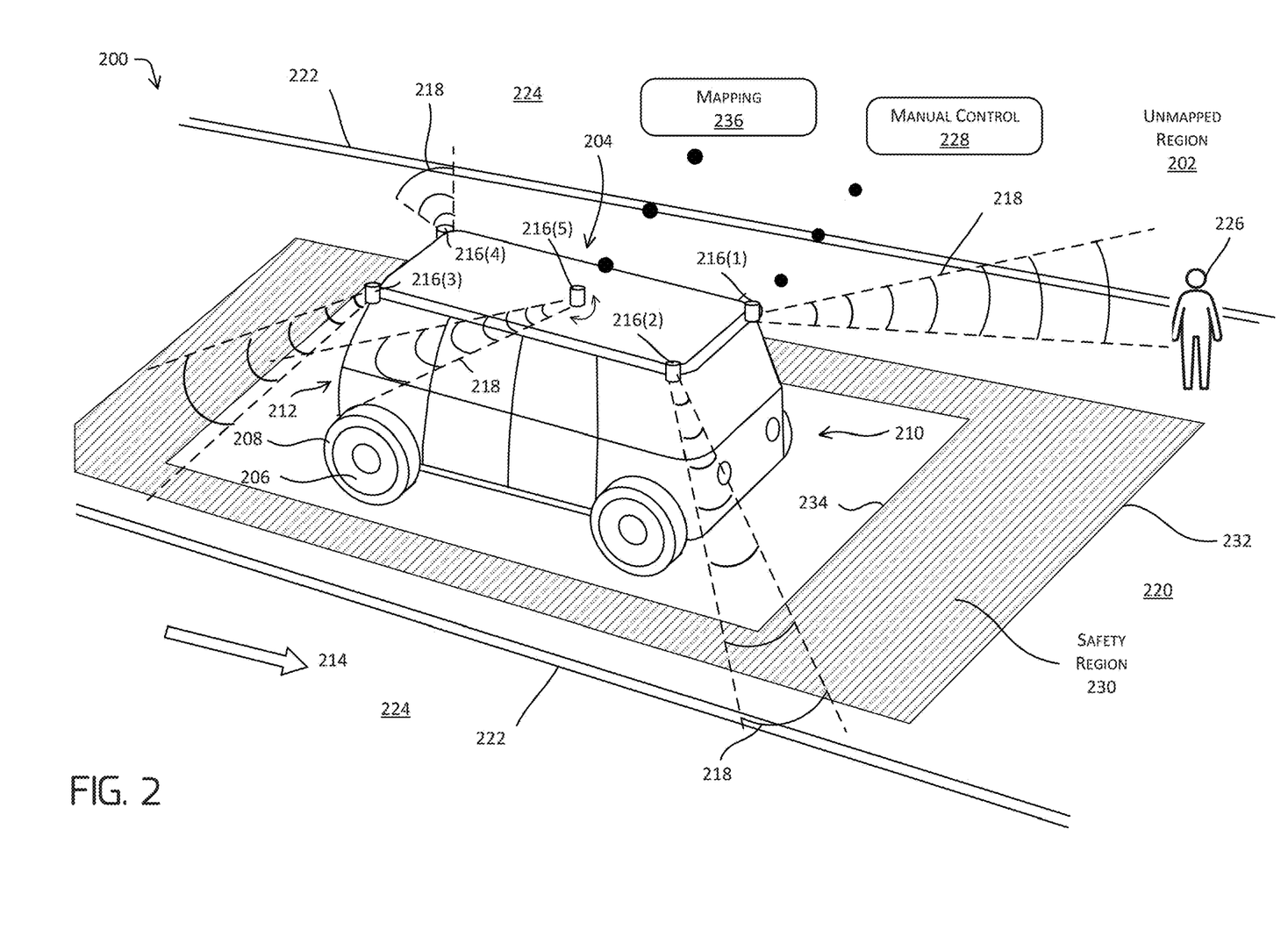
FIG. 2 illustrates another example of control of an autonomous vehicle in unmapped regions.

FIG. 2 illustrates manual control of a vehicle in an unmapped region in more detail. More specifically, FIG. 2 depicts an example of an automated vehicle system 200 configured to travel across an unmapped region 202 (which may correspond to the unmapped region 122), for example, to transport people and/or cargo from or to location in the unmapped region. For purposes of illustration, the system 200 may include a vehicle 204, which may be the vehicle 102.

The example vehicle 204 shown in FIG. 2 is an automobile having four wheels 206 and respective tires 208 for each of the wheels 206. The example vehicle 204 may have four-wheel steering and may operate generally with equal performance characteristics in all directions. For example, like the vehicle 104, the vehicle 204 may be a bi-directional vehicle, such that either of a first end 210 or a second end 212 of the vehicle 204 may be the front end of the vehicle 204, depending on the direction of travel of the vehicle. In the example embodiment, the vehicle 204 may be travelling generally in a first direction 214, such that the first end 210 of the vehicle is the leading or "front" end.

In the example shown in FIG. 2, the system 200 can also include a plurality of sensors assemblies, which may include RADAR sensors, LiDAR sensors, SONAR sensors, time of flight sensors, image sensors, microphones, or any combination thereof, mounted on the vehicle 204. More specifically, the system 200 is illustrated as including a plurality of sensor assemblies 216(1), 216(2), 216(3), 216(4) arranged at corners of the vehicle 204 and a sensor assembly 216(5) disposed substantially centrally on a roof of the vehicle 204. (Hereinafter, the sensor assemblies 216(1), 216(2), 216(3), 216(4), 216(5) may be referred to, collectively, as the sensor assemblies 216.) For purposes of illustration, a field of view 218 is associated with each of the sensor assemblies 216. The sensor assemblies 216 may be mounted to a portion of the vehicle 204 that provides a line-of-site view of a portion of the environment around the vehicle 204, with at least a portion of the sensor assemblies 216 having a field of view generally aligned with the direction of travel. The sensor assemblies 216 may be arranged in a predetermined pattern or configuration, for example, in order to provide a desired area of coverage of an environment of the vehicle. In some instances, the sensor assemblies 216 may be arranged in a pattern that enables the fields of view 218 associated with the sensor assemblies 216 (or associated with sensors comprising the sensor assemblies 216) to provide 360-degrees of sensing around the vehicle 204. Accordingly, the sensor assemblies 216 may enable the vehicle 204 to detect objects regardless of the direction of travel of the vehicle 204. This arrangement may also enable the system 200 to detect objects approaching from the sides of the vehicle 204 (e.g., a dog, or other animal, running into the street) and/or from behind (e.g., an emergency vehicle).

The fields of view 218 associated with one or more of the sensor assemblies 216(1), 216(2), 216(3), 216(4) may be substantially wider than illustrated, e.g., each field of view 218 may provide at least 90-degrees of coverage when only four sensor assemblies are provided, as in the example. Additional sensors may also be provided. According to some examples, one or more of the sensors may be mounted in a fixed manner, for example, so that data captured from the sensors are captured from a constant orientation relative to the vehicle 204. In such examples, the data may always be captured from the same angle relative to the vehicle 204 in both the vertical and lateral directions. In other implementations, sensors associated with the sensor assemblies 216 may oscillate or rotate to provide a greater field of coverage. For example, the sensor assembly 216(5) may include a rotating, oscillating-type, or solid-state LiDAR sensor that may be arranged to sweep or scan a full 360-degrees around the vehicle 204. Other patterns and arrangements of the sensor assemblies 216 are contemplated. The vehicle 204 may also include any number and type of sensors and is not limited to the illustrated examples and configurations. For instance, although the example sensor assemblies 216 shown are mounted to the roof of the vehicle, one or more sensors can be mounted to other portions of the vehicle 204. For example, one or more sensors can be mounted to the first end 210 and/or the second end 212 of the vehicle 204, for example, at a location generally corresponding to the location of a bumper of a conventional car.

In the illustrated example, the sensor assemblies 216(1), 216(2), 216(3), 216(4) may include one or more of a time of flight sensor, an IMU sensor, a radar sensor, and/or a camera, and the sensor assembly 216(5) may include a LiDAR sensor. During operation, e.g., autonomous operation, of the vehicle 204, data from the sensor assemblies 216 may be used to navigate mapped regions. For example, sensor data from the sensor assemblies 216 may be used by one or more of a localization component, a perception component and/or a planning component, e.g., to determine a position of the vehicle 204 in the mapped region, identify objects in the environment, and/or determine one or more trajectories through the mapped region.

However, in unmapped regions, like the unmapped regions 122, 202, at least some of the sensors cannot be used in the same manner, e.g., because there is no or insufficient map data associated with the unmapped region. Thus, according to implementations described herein, functionality of the sensor assemblies 216 and/or use of data from the sensor assemblies 216 may be altered. In one example, each of the sensors associated with the sensor assemblies 216 may be powered down in the unmapped region. For example, powering down the sensors may result in energy efficiency while the vehicle is manually controlled.

In another example, sensor data from one or more of the sensors may be used to augment manual controlling. In the context of FIG. 2, one or more of the sensor assemblies 216(1), 216(2), 216(3), 216(4) may be used to detect objects in the unmapped region 202, e.g., and data associated with the objects may be used to avoid the objects. In the example of FIG. 2, the vehicle 204 drives on a drivable surface 220, which is bounded by edges 222. For example, the edges 222 may separate the drivable surface 220 from an undrivable surface 224. For example, the drivable surface 220 may be a driveway or private road, and the undrivable surface 224 may be a lawn. As also illustrated, a person 226 may be standing on the drivable surface 220. For example, the person may be a passenger-in-waiting, e.g., who may have requested the vehicle. As will be appreciated, this is merely an example; other driving scenarios, types of objects, and the like may also benefit from techniques described herein.

As noted above, travel through the unmapped region 202 may be performed according to manual control signals, e.g., received from a manual control interface. However, allowing unfettered remote or manual controlling may allow the vehicle to be controlled to travel on the undrivable surface 224 and/or without awareness of the person 226. Implementations of this disclosure alleviate these problems, however, by capturing some sensor data, e.g., by sensor assemblies 216(1), 216(2), 216(3), 216(4), and using that captured data to augment control signals, e.g. at a manual control component 228. Thus, as illustrated, the sensor assembly 216(1) may detect the presence of the person 226, and the manual control component 230 may use sensor data from the sensor assembly 216(1) to override or alter manual control commands that would cause the vehicle to travel too closely to the person 226. For instance, the sensor assembly 216(1)

may include a time of flight sensor that allows for an approximation of a distance between the vehicle 204 and the person 226 and the manual control component 230 may stop the vehicle if the distance is equal to or below a threshold distance. Similarly, the sensor assemblies 216(1), 216(2), 216(3), 216(4) may provide sensor data that allows the manual control component 228 to detect a presence of the undrivable surface 224, e.g., at the edge 222, and override or modify manual control signals that would have the vehicle drive on the undrivable surface 224.

As also illustrated in FIG. 2, sensor data from the sensor assemblies 216(1), 216(2), 216(3), 216(4) may allow the autonomous vehicle 204 (or the manual control component 230) to create a virtual safety region 230 relative to the vehicle 204. In the illustrated embodiment, the safety region 230 envelopes the vehicle, although in other implementations, the safety region 230 may extend only in a direction of travel of the vehicle 204. The safety region 230 may be a virtual zone having an outer perimeter 232. In some implementations, when sensor data, e.g., time of flight data, radar data, and/or the like, captured by one of the sensor assemblies 216 indicates that an object, such as the person 226, is within the outer perimeter 232, manual control signal may be augmented or ignored. For example, the outer perimeter 232 may define the maximum distance at which the vehicle 204 should be moving relative to an object in the unmapped region 202, such that the presence of any object in the safety region 230 will prevent further manual controlling of the vehicle. Alternatively, manual control signals may be altered based on objects detected in the environment. For example, when no objects are in the safety region, manual controlling may cause the vehicle 204 to move at a commanded speed, e.g., a maximum speed. However, when an object is detected in the safety region 230, the vehicle may alter to the commanded speed, e.g., to a speed slower than the maximum speed. For instance, the maximum speed may be 5 miles-per-hour whereas the altered speed may be a slower speed, e.g., of about 2 or 3 miles-per-hour. Moreover, the commanded speed may vary, e.g., linearly, based on the distance of the object from the vehicle. In some instances, the safety region 230 may also include an inner extent or inner perimeter 234, which may be offset from the vehicle 204. When objects are detected at or closer to the vehicle 204 than the inner perimeter 234, movement of the vehicle may be prohibited.

Thus, some subset or all of the sensor assemblies 216 may be used in the unmapped region to promote safe manual controlling of the vehicle. Moreover, data from some or all of the sensor assemblies 216 may be used to assist in mapping the unmapped region 202. For example, the sensor assembly 216(5), which may include a LiDAR sensor in some examples, may continue to capture data as the vehicle 204 traverses, according to manual controlling, through the unmapped region 202. In some embodiments, LiDAR data from the sensor assembly 216(5) may be transmitted to a mapping component 236, e.g., to create one or more maps of the unmapped region 202. For example, the LiDAR data may be used by the mapping component 236 to define physical features in the unmapped region 202. The mapping component 236 may also receive additional sensor data. By way of non-limiting example, one or more of the sensor assemblies 216 may capture image data, e.g., using a camera, of the unmapped region 202, and the mapping component 236 may utilize the image data to construct a map. For example, the mapping component 236 may utilize feature recognition techniques to determine physical attributes of the unmapped region 202. In some examples, multiple types of sensor data may be used to construct the map(s).

According to implementations of this disclosure, the mapping component 236 may update map data such that the unmapped region 202 may become a mapped region. Accordingly, subsequent requests to proceed to a destination may be based entirely on map data, potentially obviating the need for manual controlling.

Figure 3:
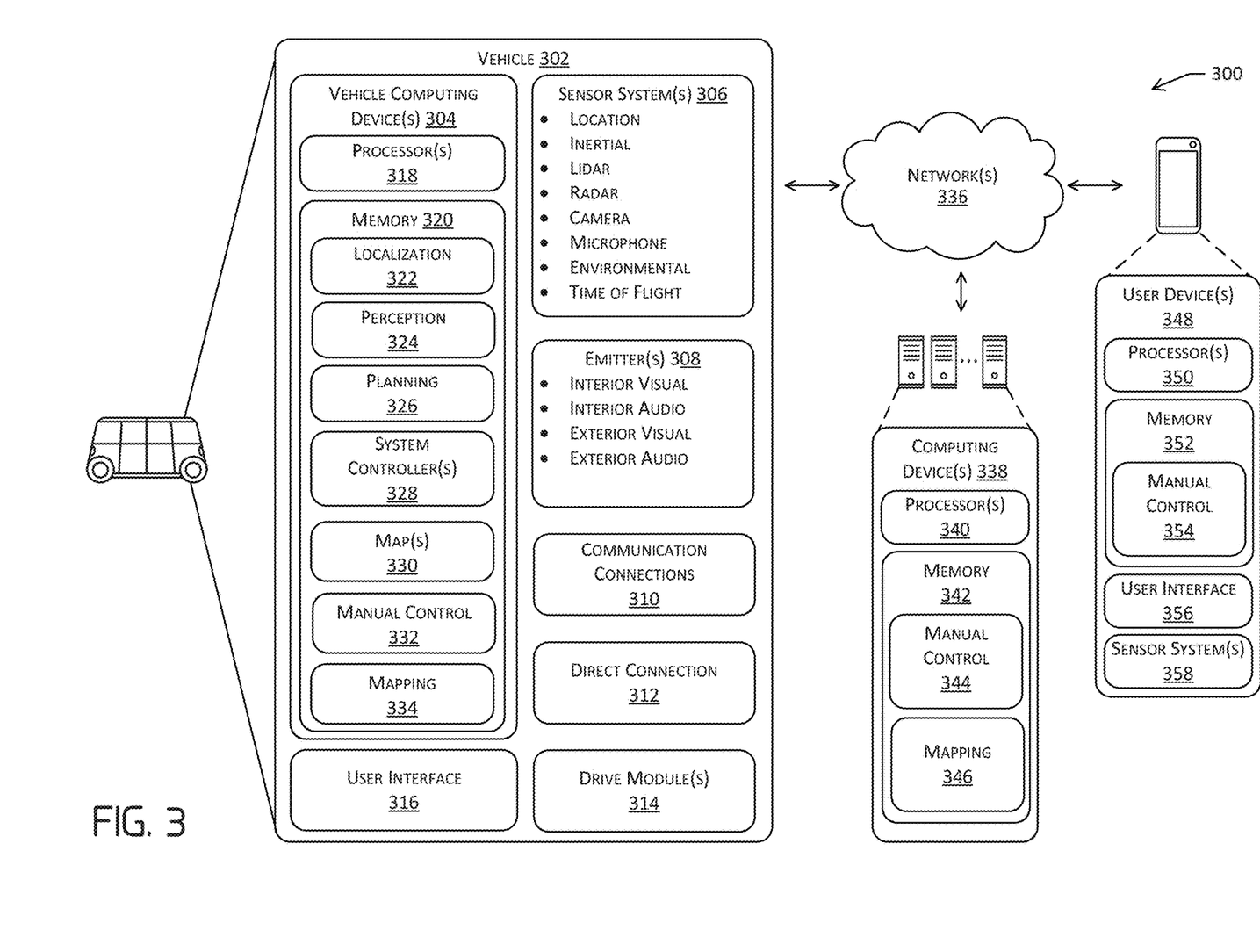
FIG. 3 is a block diagram illustrating an example computing system for controlling an autonomous vehicle in unmapped regions.

FIG. 3 depicts a block diagram of an example system 300 for implementing the techniques described herein. In at least one example, the system 300 can include a vehicle 302, which can correspond to the vehicle 102 in FIG. 1.

The vehicle 302 can include a vehicle computing device 304, one or more sensor systems 306, one or more emitters 308, one or more communication connections 310, at least one direct connection 312, one or more drive modules 314, and a user interface 316.

The vehicle computing device 304 can include one or more processors 318 and memory 320 communicatively coupled with the one or more processors 318. In the illustrated example, the vehicle 302 is an autonomous vehicle; however, the vehicle 302 could be any other type of vehicle. In the illustrated example, the memory 320 of the vehicle computing device 304 stores a localization component 322, a perception component 324, a planning component 326, one or more system controllers 328, one or more maps 330, a manual control component 332, and a mapping component 334. Though depicted in FIG. 3 as residing in memory 320 for illustrative purposes, it is contemplated that the localization component 322, the perception component 324, the planning component 326, the one or more system controllers 328, the one or more maps 330, the manual control component 332, and/or the mapping component 334 can additionally, or alternatively, be accessible to the vehicle 302 (e.g., stored on, or otherwise accessible by, memory remote from the vehicle 202).

In at least one example, the localization component 322 can include functionality to receive data from the sensor system(s) 306 to determine a position and/or orientation of the vehicle 302 (e.g., one or more of an x-, y-, z-position, roll, pitch, or yaw). For example, the localization component 322 can include and/or request/receive a map of an environment and can continuously determine a location and/or orientation of the autonomous vehicle within the map. In some instances, the localization component 322 can utilize SLAM (simultaneous localization and mapping), calibration, localization and mapping, simultaneously techniques, relative SLAM, bundle adjustment, non-linear least squares optimization, or the like to receive image data, LiDAR data, radar data, IMU data, GPS data, wheel encoder data, and the like to accurately determine a location of the autonomous vehicle. In some instances, the localization component 322 can provide data to various components of the vehicle 302 to determine an initial position of an autonomous vehicle for generating a candidate trajectory, as discussed herein.

In some instances, the perception component 324 can include functionality to perform object detection, segmentation, and/or classification. In some examples, the perception component 324 can provide processed sensor data that indicates a presence of an entity that is proximate to the vehicle 302 and/or a classification of the entity as an entity type (e.g., car, pedestrian, cyclist, animal, building, tree, road surface, curb, sidewalk, unknown, etc.). In additional and/or alternative examples, the perception component 324 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In general, the planning component 326 can determine a path for the vehicle 302 to follow to traverse through an environment. For example, the planning component 326 can determine various routes and trajectories and various levels of detail. For example, the planning component 326 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 326 can generate an instruction for guiding the autonomous vehicle along at least a portion of the route from the first location to the second location. In at least one example, the planning component 326 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 302 to navigate.

In at least one example, and as discussed herein, the planning component 326 can also determine whether a destination location is in a mapped region or in an unmapped region. When the destination location is in an unmapped region, the planning component 326 may determine a new location proximate the destination, but in the mapped region. For example, the planning component may determine that the destination is associated with a street address and may determine a mouth of a driveway at the street address as the new location. As another example, the planning component 326 can determine that a pickup location associated with a destination is in an unmapped location at the address. As used herein, a destination may be a pickup location and/or a drop off location, which may be a specific location (e.g., a parking space, a loading zone, a portion of a ground surface, a location on a driveway distant from the street, a GPS coordinate, etc.) where the vehicle 302 can stop to pick up and/or drop off passengers and/or cargo. In at least one example, the planning component 326 determines the proximate location as a location in a mapped region when the pickup location is in an unmapped region.

In at least one example, the vehicle computing device 304 can include one or more system controllers 328, which can be configured to control steering, propulsion, braking, safety, emitters, communication, and other systems of the vehicle 302. These system controller(s) 328 can communicate with and/or control corresponding systems of the drive module(s) 314 and/or other components of the vehicle 302.

The memory 318 can further include one or more maps 330 that can be used by the vehicle 302 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., LiDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed. In at least one example, the one or more maps 330 can include at least one map (e.g., images and/or a mesh). In some example, the vehicle 302 can be controlled based at least in part on the maps 330. That is, the maps 330 can be used in connection with the localization component 322, the perception component 324, and/or the planning component 326 to determine a location of the vehicle 302, identify objects in an environment, and/or generate routes and/or trajectories to navigate within an environment. As described further herein, the maps 330 may also be used to determine whether a destination, e.g., a pick-up or drop off location, is in a mapped region or an unmapped region. As used herein, "unmapped region" may refer to any region in an environment in which insufficient map data is available to allow for confident autonomous travel. Thus, for example, some map data may be available for "unmapped regions," but the amount of data may be below a threshold necessary or desired for autonomous travel.

In some examples, the one or more maps 330 can be stored on a remote computing device(s) (such as the computing device(s) 338) accessible via network(s) 336. In some examples, multiple maps 330 can be stored based on, for example, a characteristic (e.g., type of entity, time of day, day of week, season of the year, etc.). Storing multiple maps 330 can have similar memory requirements, but increase the speed at which data in a map can be accessed.

The manual control component 332 can include functionality to allow for manual control of the vehicle. For example, the manual control component 332 can configure the vehicle computing device(s) 304 to receive control commands from a person or entity associated with the vehicle, e.g., a passenger in the vehicle, a teleoperator, a user device associated with a ride request, or the like. In some instances, the manual control component 330 can receive user input, e.g., via the user interface 316, the computing devices 336, and/or the user device 344, to control movement of the vehicle, such as in an unmapped region. In some examples, the manual control component 332 may prompt the user for input, e.g., upon arrival at a location at a boundary of a mapped region and an unmapped region.

In some implementations, the manual control component 332 may also limit control commands, e.g., by ignoring control commands that could be harmful and/or by altering control commands to allow for safer travel. For example, the manual control component 332 may store information about the extents of one or more safety regions proximate the vehicle. As used herein, a safety region may be a virtual region around the vehicle, and when objects are detected in the safety region(s), manual control commands may be ignored and/or altered. In this manner, a passenger or other individual that is manually controlling the vehicle may be prohibited from controlling the vehicle in an unsafe manner and/or a manner that may cause damage to objects, the environment, and/or the vehicle. As a non-limiting example, such a component may limit a maximum speed and/or ability to drive in one or more directions based on detected obstacles. In addition, particular sensors or sensor types, such as time of flight, radar, etc., rather than all sensors available, may be used to detect objects in the safety region.

In some implementations, the manual control component 332 can implement procedures to promote security when using remote controllers. For example, the manual control component may only allow remote controlling by a device when the controller is an authorized controller. By way of non-limiting example, when manual control is performed by a user device, e.g., via an application on the user device, control may only be allowed when the application (or user of the application) is authenticated. For instance, the manual control component 332 may generate and transmit a request to take manual control of the vehicle, and the request may include a passcode that the user may be prompted to enter to begin manual control. In still other examples, the manual control component 332 may instruct a user to download a single-use application or module enabling manual control and which may be used only in a specific unmapped region and/or for a specific duration. Moreover, manual control functionality may be available only upon determining the vehicle is in proximity to the unmapped region and/or that the manual controller is in proximity to the unmapped region and/or upon verification of biometric information associated with the user. The manual control component 332 may also lock, disable, or otherwise restrict access to the manual controlling functionality when one or more criteria are not met. Additional aspects of the manual control component 332 are discussed throughout this disclosure.

The mapping component 334 may be substantially the same as the mapping component 236, and can include functionality to generate and/or augment map data, such as the maps 330. For example, the mapping component 334 may correspond to the mapping component 236 described above. In some implementations, the mapping component 334 can receive sensor data from one or more of the sensor system(s) 306 and generate maps, such as the maps 330, using the sensor data. Accordingly, in some implementations, the mapping component 334 can obtain sensor data of an unmapped region and generate one or more maps of the unmapped region.

In at least one example, the sensor system(s) 306 can include LiDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 306 can include multiple instances of each of these or other types of sensors. For instance, the LiDAR sensors can include individual LiDAR sensors located at the corners, front, back, sides, and/or top of the vehicle 302. As another example, the camera sensors can include multiple cameras disposed at various locations about the exterior and/or interior of the vehicle 302. The sensor system(s) 306 can provide input to the vehicle computing device 304. Additionally or alternatively, the sensor system(s) 306 can send sensor data, via the one or more networks 334, to the one or more computing device(s) at a particular frequency, after a lapse of a predetermined period of time, in near real-time, etc.

The vehicle 302 can also include one or more emitters 308 for emitting light and/or sound. The emitters 308 in this example include interior audio and visual emitters to communicate with passengers of the vehicle 302. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. In some examples, one or more of the interior emitters may be used to signal to the passenger that the vehicle is approaching or has arrived at an unmapped region and that continued movement in the unmapped region will require permission and/or manual control. In addition, or alternatively, the interior emitters may alert the passenger(s) that a teleoperator or other external source (e.g., a passenger-in-waiting) has taken manual control of the vehicle 302. The emitters 308 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology. Moreover, the exterior emitters may be used to signal to a nearby entity that the vehicle is under manual control and/or to request an input for controlling, e.g., via the user device(s) 348.

The vehicle 302 can also include one or more communication connection(s) 310 that enable communication between the vehicle 302 and one or more other local or remote computing device(s). For instance, the communication connection(s) 310 can facilitate communication with other local computing device(s) on the vehicle 302 and/or the drive module(s) 314. Also, the communication connection(s) 310 can allow the vehicle to communicate with other nearby computing device(s) (e.g., other nearby vehicles, traffic signals, etc.). The communications connection(s) 310 also enable the vehicle 302 to communicate with a remote teleoperations computing device or other remote controllers.

The communications connection(s) 310 can include physical and/or logical interfaces for connecting the vehicle computing device 304 to another computing device or a network, such as network(s) 336. For example, the communications connection(s) 310 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 302 can include one or more drive modules 314. In some examples, the vehicle 302 can have a single drive module 314. In at least one example, if the vehicle 302 has multiple drive modules 314, individual drive modules 314 can be positioned on opposite ends of the vehicle 302 (e.g., the front and the rear, etc.). In at least one example, the drive module(s) 314 can include one or more sensor systems to detect conditions of the drive module(s) 314 and/or the surroundings of the vehicle 302. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LiDAR sensors, radar sensors, etc. Some sensors, such as the wheel encoders can be unique to the drive module(s) 314. In some cases, the sensor system(s) on the drive module(s) 314 can overlap or supplement corresponding systems of the vehicle 302 (e.g., sensor system(s) 306).

The drive module(s) 314 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 314 can include a drive module controller which can receive and preprocess data from the sensor system(s) and to control operation of the various vehicle systems. In some examples, the drive module controller can include one or more processors and memory communicatively coupled with the one or more processors. The memory can store one or more modules to perform various functionalities of the drive module(s) 314. Furthermore, the drive module(s) 314 also include one or more communication connection(s) that enable communication by the respective drive module with one or more other local or remote computing device(s).

In at least one example, the direct connection 312 can provide a physical interface to couple the one or more drive module(s) 314 with the body of the vehicle 302. For example, the direction connection 312 can allow the transfer of energy, fluids, air, data, etc. between the drive module(s) 314 and the vehicle. In some instances, the direct connection 312 can further releasably secure the drive module(s) 314 to the body of the vehicle 302.

The user interface 316 may include one or more devices, buttons and/or control panels via which a passenger can communicate with the vehicle 302. In non-limiting examples, a passenger in the vehicle 302 may control functionality of the vehicle 302 via interaction(s) with the user interface 316. For example, in some aspects of this disclosure, when the vehicle 302 is in an unmapped region, the passenger may have limited control of movements of the vehicle 302, and that control may be facilitated by the user interface 316. The user interface 316 may be configured to receive user inputs to control acceleration, braking, a forward or reverse selection, and/or steering of the autonomous vehicle 302, as well as (in those examples where the vehicle is bidirectional), which side of the vehicle 302 is to be the front. In some example, the user interface 316 may include a remote controller, joystick or similar hand-held control that is connected to the vehicle computing device(s) 304, e.g., via a wired or wireless connection, and has controls, e.g., buttons, switches, directional pads, used to control the vehicle 302. The user interface 316 may have an associated receiver (not shown) that is operably connected to the vehicle 302, e.g., via insertion into a port or other receptacle.

In other examples, the user interface 316 may comprise a microphone configured to receive a verbal or spoken input. Generally, the user interface 316 may provide a means though which a passenger can interface with the vehicle computing device(s) 304.

In at least one example, the vehicle 302 may be in communication, via one or more network(s) 336, with one or more computing device(s) 338 and/or one or more user device(s) 348 (also referred to as a user device 348). For example, as described herein, the vehicle 302 can communicate with the one or more computing device(s) 338 and/or the user device(s) 348, via the network(s) 336, e.g., to facilitate control of the vehicle in unmapped regions. In some examples, the vehicle 302 can receive control signals from the computing device(s) 236 and/or the user device(s) 348. In other examples, the vehicle 302 can transmit information to the computing device(s) 338 and/or the user device(s) 348. For example, the vehicle 302 may indicate to the computing device(s) 338 and/or the user device(s) 348 that the vehicle has arrived at an unmapped region and/or transmit sensor data corresponding to objects in the environment of the vehicle 302. The vehicle 302 may also request permission to proceed in the unmapped region and/or may request manual controls, e.g., from a passenger of the vehicle 302, from the computing device(s) 338, and/or from the user device(s) 348.

The computing device(s) 338 may be embodied as a teleoperator or remote controlling system. In at least one example, the computing device(s) 338 can include processor(s) 340 and memory 342 communicatively coupled with the processor(s) 340. In the illustrated example, the memory 342 of the computing device(s) 338 stores a manual control component 344 and a mapping component 346. In at least one example, the manual control component 344 can correspond to at least a portion of the manual control component 332. For example, the manual control component 344 may configure the computing device(s) 338 to receive user inputs, e.g. from a teleoperator, and to generate and transmit control signals to the vehicle 302, e.g., to control the drive module(s) 314. Moreover, the mapping component 346 can correspond to at least a portion of the mapping component 334. For example, the mapping component 346 may configure the computing device(s) 338 to receive sensor data, e.g., from the sensor system(s) 306, and generate maps based on the sensor data.

In at least one example, the vehicle 302 can also send and/or receive data to and from the user device(s) 348, via the network(s) 336. The user device(s) 348 can be device(s) associated with a current passenger of the vehicle 302, a passenger-in-waiting and/or of a user who hailed the vehicle 302 for another passenger. In at least one example, the user device(s) 348 can include one or more processors 350 and memory 352 communicatively coupled with the one or more processors 350. In the illustrated example, the memory 352 of the remote computing device(s) 348 stores a manual control component 354. In at least one example, the manual control component 354 can be downloaded by the user device(s) 348, for example, as a part of or separate from a ride-hailing application. The manual control component 354 may be similar to the manual control component 228, the manual control component 332, and/or the manual control component 344. In at least one example, the manual control component 354 can receive information about a request for the user to manually control the vehicle 302 and may configure the user device 348 to receive user input(s) to control the autonomous vehicle 302. For example, the manual control component may configure a user interface 356 on the user device 348 to receive user inputs, generate control commands based on the user inputs, and/or transmit the control commands to the vehicle 302, e.g., to control the drive module(s) 314. The user interface(s) 356 can include, but are not limited to, one or more displays (e.g., including input capabilities), gesture-based inputs, haptic feedback, voice-activated inputs, etc.

The user device 348 can further include one or more sensor systems 358, which can include location sensor(s) (e.g., GPS sensor(s)), inertial (e.g., accelerometer(s), magnetometer(s), etc.), camera(s), microphone(s), and the like. For example, sensor data from the one or more location sensors of the sensor system(s) 358 may be used to determine a location associated with a destination. For example, GPS coordinates of the user device 348 may be used to identify a destination, e.g., a destination that is outside a mapped region.

The processor(s) 316 of the vehicle 302, the processor(s) 338 of the computing device(s) 336, and/or the processor(s) 350 of the user device(s) 348 can be any suitable processor capable of executing instructions to process data and perform operations as described herein. By way of example and not limitation, the processor(s) 316, 338, and 350 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 318, 340, and 352 are examples of non-transitory computer-readable media. The memory 318, 340, and 352 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 3 is illustrated as a distributed system, in alternative examples, components of the vehicle 302 can be associated with the computing device(s) 336 and/or components of the computing device(s) 336 can be associated with the vehicle 302. That is, the vehicle 302 can perform one or more of the functions associated with the computing device(s) 336, and vice versa. Further, aspects of the manual control components can be performed on any of the devices discussed herein.

Figure 4:
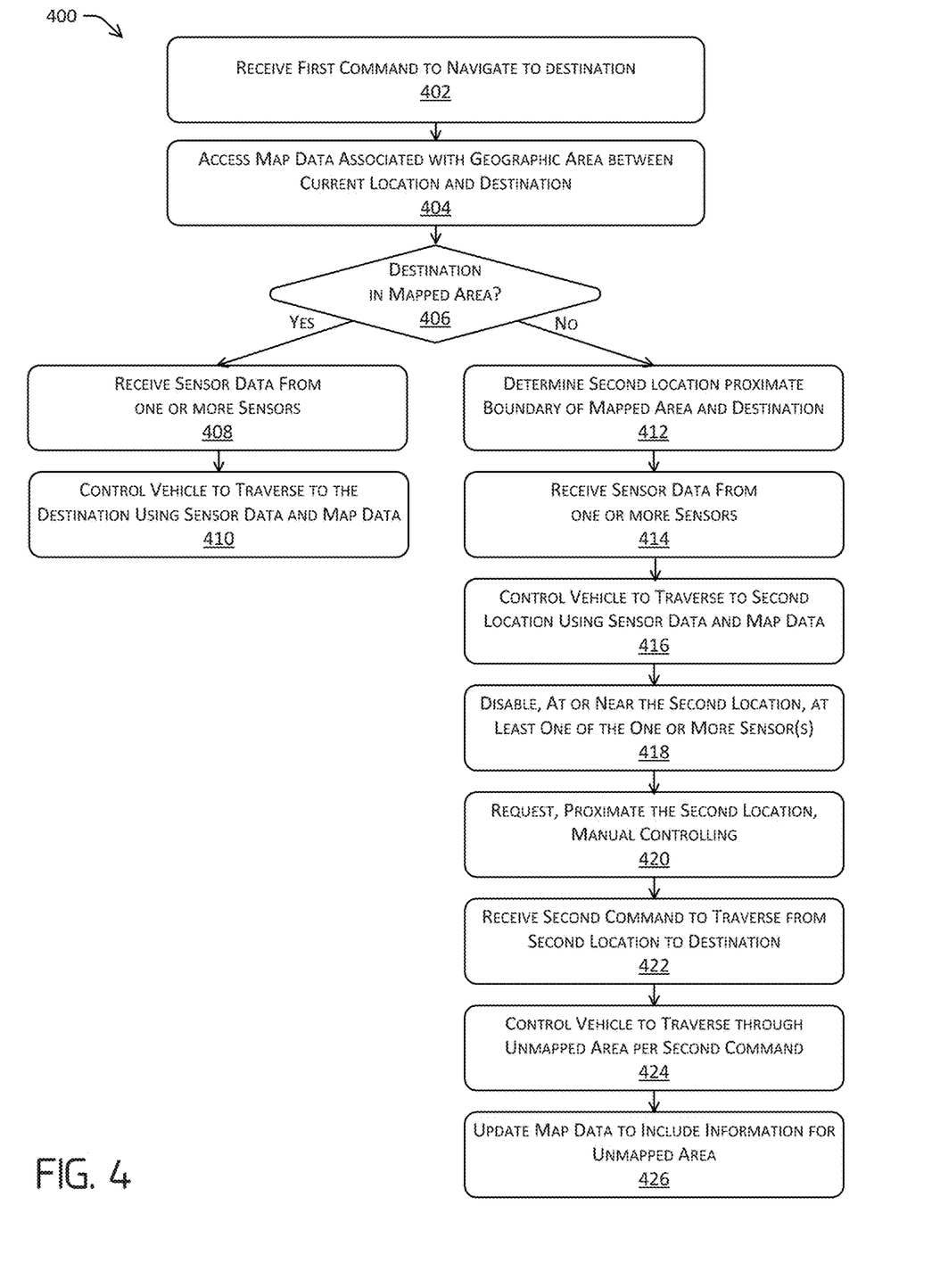
FIG. 4 is a flow chart representative of one or more processes for controlling an autonomous vehicle in unmapped regions.
Figure 5:
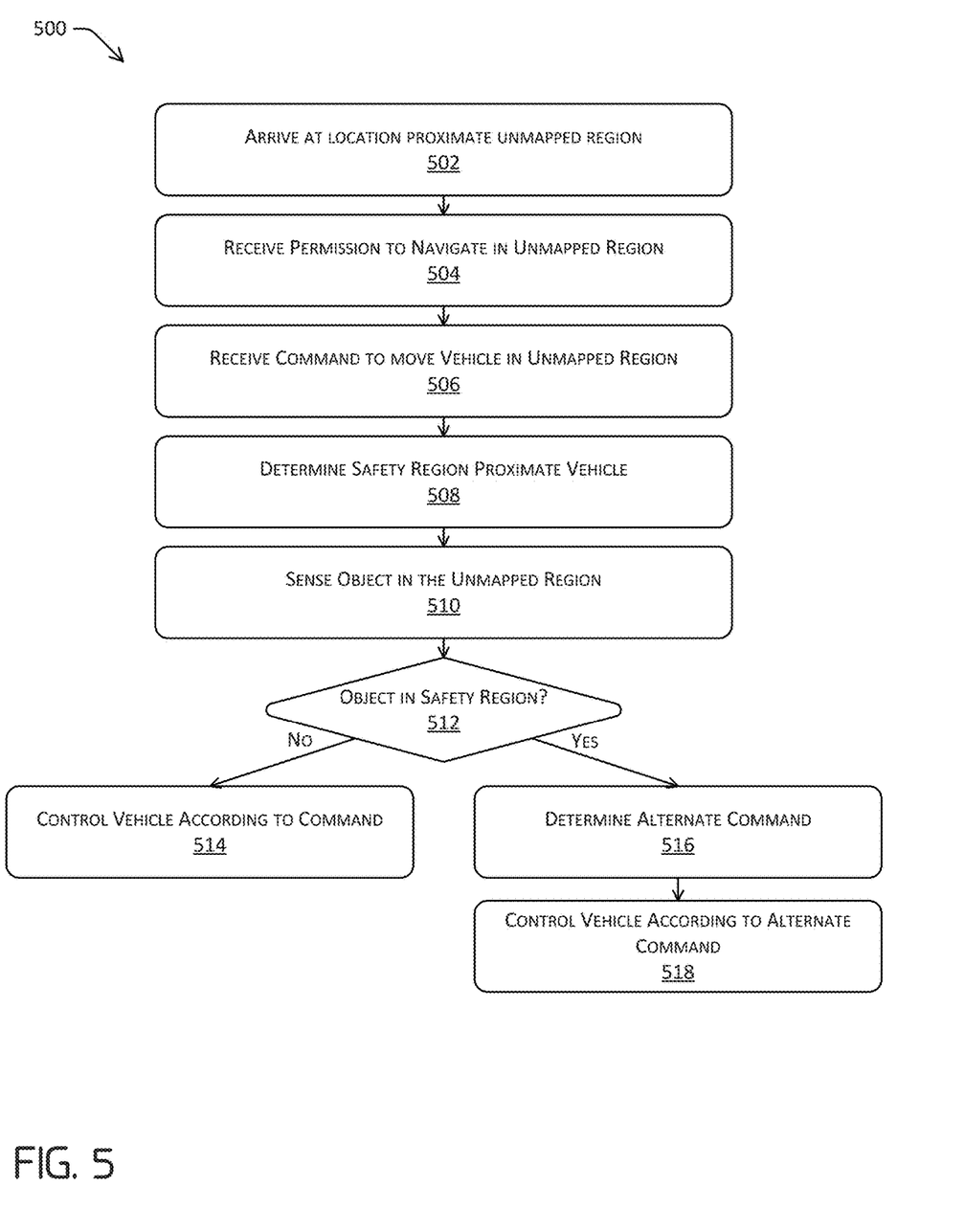
FIG. 5 is a flow chart representative of one or more processes for controlling an autonomous vehicle in unmapped regions.

FIGS. 4 and 5 are flowcharts showing example processes involving manual control of an autonomous vehicle in unmapped regions as described herein. Specifically, FIG. 4 illustrates a process 400 in which a destination is determined to be in a mapped region or in an unmapped region and associated operations in either instance. FIG. 5 illustrates a process 500 that provides additional details about manual control of an autonomous vehicle. The processes 400, 500 are described with reference to the vehicles 102, 202 and/or 302 shown in FIGS. 1 through 3 for convenience and ease of understanding. However, the processes 400, 500 illustrated in FIGS. 4 and 5 are not limited to being performed using the vehicles 102, 302, 302 and can be implemented using any of the other vehicles described in this application, as well as vehicles other than those described herein. Moreover, the vehicles 102, 202, 302 described herein are not limited to performing the processes 400, 500 illustrated in FIGS. 4 and 5.

The processes 400, 500 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods 400, 500 can be combined in whole or in part with each other or with other methods.

FIG. 4 is a flowchart illustrating an example process 400 for manual control of an autonomous vehicle in unmapped regions, as described herein.

At operation 402, the process 400 receives a command to navigate to a destination. In some examples, the command may be generated in response to a user request to be picked up or dropped off at a destination. Using the example of FIG. 1, the command for the vehicle 102 to navigate to the destination 120. The command may be generated in response to a user input to a user device, such as the user device 128 or the user device 244. In some examples, the user may be prompted to identify the destination 120 via interaction with a map or other representation of the environment 100 on the user device 128. For instance, the user may be provided with an aerial view of the environment 100 and may select, e.g., by touching, tapping, or otherwise, the destination 120 on the view of the environment 100. In other implementations, the user may input, e.g., by typing, verbal input, or otherwise, an address associated with the destination. The user may then be prompted to identify a specific location associated with the address, e.g., an identification of curb- or roadside, a specific building number, a parking space, a location proximate an entry door, or the like. The specific location may also be input, e.g., by selection, verbal input, or otherwise, as the destination 120. By way of non-limiting example, if the user specifies the address associated with the geographic area 108 as the destination, the user may then be prompted, e.g., via a graphical user interface on the user device 128 or the user interface 356 on the user device 348 to identify the destination 120 with more specificity. In some examples, the graphical user interface may identify to the user a suggested pickup or drop off location, e.g., a roadside location, and ask whether that location is acceptable or if there is a preferred location. If there is a preferred location, like the destination 120, the user may be prompted to identify that location, with the command being generated and transmitted based on the identification of the location.

At operation 404, the process accesses map data associated with a geographic area between the current location and the destination. For example, the vehicle may access maps, such as the one or more maps 330, which may include information about the environment 100, including the road network 114, structures in the environment, and the like.

At operation 406, the process can include determining whether the destination is in the mapped region. For example, the operation 406 can include receiving a binary confirmation (e.g., yes/no) of whether sufficient map data is available to traverse autonomously to the destination. If map data is available for the destination, i.e., the destination is in a mapped region, the process 400 proceeds to operation 408.

At operation 408, the process receives sensor data from one or more sensors. As described above, the vehicle 302 can include sensor system(s) 306. In at least one example, the sensor system(s) 236 can include LiDAR sensors, RADAR sensors, ultrasonic transducers, SONAR sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), microphones, wheel encoders, environment sensors (e.g., temperature sensors, humidity sensors, light sensors, pressure sensors, etc.), etc. The sensor system(s) 306 can provide input to the vehicle computing device(s) 304, and one or more systems of the vehicle computing device(s) 304 can utilize the input, e.g. to control the vehicle as in 410 and/or to update any of the mapped regions.

At operation 410, the process includes controlling the vehicle to travel to the destination using the sensor data (e.g., the sensor data obtained at 408) and the map data (e.g., including the map data considered at 404). For example, and as discussed herein, the vehicle computing device(s) 304 can receive the sensor data and/or the map data as inputs for processing by the localization component 320, the perception component 324, and/or the planning component 326. These and other components may facilitate autonomous travel of the vehicle to destinations in the mapped region.

If, however, at operation 406, the process determines that the destination is not in a mapped region, the process continues to operation 412.

At operation 412, the process determines a second location proximate the boundary of the mapped region and the destination. In the example of FIG. 1, the destination 120 may have been determined to be in the unmapped region 122 (at 406) and the process may then determine the second location 116 as a location in the mapped region that is proximate, e.g., near, the destination 120, but still in the mapped region. For example, the second location 116 may be determined as a location on the mapped road network 104 at or near the driveway 112. As discussed herein, the planning component 326 may use the map(s) 330 and/or information about the destination to determine the second location. In at least some examples, a user may confirm the selection of the second location 116 and/or provide an alternative second location.

At operation 414, the process 400 receives sensor data from one or more sensors. As described above, the vehicle 302 can include sensor system(s) 306. In at least one example, the sensor system(s) 306 can include LiDAR sensors, RADAR sensors, ultrasonic transducers, SONAR sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), microphones, wheel encoders, environment sensors (e.g., temperature sensors, humidity sensors, light sensors, pressure sensors, etc.), etc. The sensor system(s) 306 can provide input to the vehicle computing device(s) 304, and one or more systems of the vehicle computing device(s) 304 can utilize the input. In some examples, the operation 414 may be substantially the same as the operation 408.

At operation 416, the process includes controlling the vehicle to travel to the second location using the sensor data (e.g., the sensor data obtained at 414) and the map data (e.g., including the map data considered at 404). For example, and as discussed herein, the vehicle computing device(s) 304 can receive the sensor data and/or the map data as inputs for processing by the localization component 320, the perception component 324, and/or the planning component 326. These and other components may facilitate autonomous travel of the vehicle to destinations in the mapped region. In some examples, the operation 416 may be substantially identical to the operation 410.

The process may optionally include, at operation 418, disabling, at or near the second location, at least one of the one or more sensors for autonomous navigation purposes. For example, as the vehicle 202 arrives at the second location, some of the sensor data used to navigate to the location may be no longer necessary for autonomously navigating or controlling vehicle 202. By way of non-limiting example, as the vehicle is prepared for manual controlling, LiDAR, RADAR and/or other types of sensors may be disengaged or disabled for autonomous navigating purposes, while other sensors remain active, e.g., time of flight, to detect obstacles. Sensors may still generate sensor data, but that sensor data may not be used in connection with the autonomous navigation of the vehicle 202. Rather, it may be used to collect or generate data used for mapping the unmapped region 112. For example, as described above with reference to FIG. 2, some or all of the sensor assemblies 216 may provide sensor data to the mapping component 236 to create a map of the unmapped region. For instance, LiDAR data (e.g., from the sensor assembly 216(5) and/or vision data captured by cameras forming at least a portion of the sensor assemblies 216(1), 216(2), 216(3), 216(4).

At operation 420, the process may request, proximate the second location, manual controlling. For example, and with reference to FIG. 1, as the vehicle 102 approaches the second location 116, the vehicle 102 may indicate to the passenger desiring to be dropped off at the destination 120 or to the would-be-passenger waiting at the destination 120 that the vehicle 102 may need manual controlling to advance through the unmapped region 122, i.e., from the second position 116 to the ultimate destination 120. As described herein, the manual controlling may rely on a user, such as the passenger or a passenger-in-waiting. In other implementations, a teleoperations system may be prompted to take control of the vehicle 302 (e.g. the vehicle may send a request to a teleoperations system for input).

At operation 422, the process receives a second command to traverse from the second location to the destination. For example, upon arriving at the second position 116 in the mapped region, the vehicle may configure a user interface in the vehicle, such as the user interface 316, to receive user inputs comprising drive instructions. As described herein, the drive instructions may include one or more of a heading or direction, a speed, an acceleration, or the like. In other examples, the second control command may be received from a user device, such as the user device 344. For example, the vehicle may configure an application running on the user device 344 to configure the user device 344 to receive user inputs and generated and transmit the second control command to the vehicle 302 in accordance with such user inputs. In some implementations, a user interface 356 of the user device 344 may include a touch-sensitive display configured with interactive icons that allow a user to input the control commands to control the vehicle. In still further examples, the second command may be received from a remote computing device, such as the computing device(s) 336, which may comprise a teleoperations system. In examples incorporating the teleoperations system, operation 420 may additionally comprise streaming at least a portion of the sensor data to the teleoperations system.

At operation 424, the process controls the vehicle to traverse through the unmapped region in accordance with the second command. For example, the vehicle is controlled manually by a passenger, a passenger-in-waiting, or a teleoperations system in the unmapped region. In the example of FIG. 1, the vehicle traverses through the unmapped region from the second location 116 to the destination 120, e.g., along the path 124, based on manual, e.g., remote, controlling. In at least some examples, control may be limited to certain speeds (e.g. no more than 5 mph), certain accelerations, and in accordance with limited obstacle avoidance and safety procedures, as discussed herein. Moreover, as described in connection with FIG. 2, manual control signals may be altered or ignored based at least in part on sensor data. For example, some sensor data, e.g., from one or more of the sensor assemblies 216 (or one or more sensors of the sensor assemblies 216), such as sensor data from a time of flight sensor or a radar sensor, may be used to detect objects in the unmapped region 202 and/or information about a relative location or position of the objects. For example, sensors in the sensor assemblies 216 may determine whether objects in the unmapped region 202 are within the safety region 230.

At operation 426, the process may optionally update the map data to include information for the unmapped region. For example, some of the sensors may continue to capture information as the vehicle traverses through the unmapped region, and the information (from some, or all, of the sensors) may be used to update map data to include a map of the previously unmapped region. Accordingly, if the user is again summoned to the destination 120, the vehicle may be able to proceed autonomously, based on the updated map data (i.e. without having to manually control the vehicle). For example, and as discussed above in connection with FIG. 2, sensor data, e.g., including LiDAR data and vision data, may continue to be captured in the unmapped data. The LiDAR data and/or the vision data may be used to create 3D maps, e.g., representations of physical features in the environment, which may be relied upon in subsequent travels through a region.

FIG. 5 depicts an example process 500 for manual control of a vehicle in an unmapped region. For example, the process 500 may be a portion of the process 400, or may be a separate process. Some or all of the process 500 can be performed by the computing devices 304, 336 and/or the user device 344.

At operation 502, the process can include arriving at a location proximate an unmapped region. For example, in FIG. 1, the vehicle 102 may arrive at the second location 116. The second location 116 may be an intermediate location between an origination 114 and a destination 120. As described herein, the second location 116 may be determined and the vehicle may travel to the second location 116 because the destination 120 may be in an unmapped region 122. As above, such an intermediate location may be determined by the vehicle as the closest point of entry to the destination 120, associated with a driveway or entrance proximate the unmapped region 122, or otherwise selected by a user or teleoperator associated with the vehicle.

At operation 504, the process 500 can include receiving permission to navigate in the unmapped region 122. In the example of FIG. 1, when the destination 120 is in an unmapped region 122, the vehicle 102 may prompt a passenger or a passenger-in-waiting at the destination 120 to authorize travel of the vehicle 102 in the unmapped region 122. For example, the vehicle 102 may output a notification e.g., using the emitter(s) 308, the user interface 316, and/or by transmission over the networks 334, e.g., to the user device 344, that the vehicle will need assistance to travel in the unmapped region and/or prompting the user to allow the vehicle to continue. As used herein, permission may be permission from a person associated with the property, or permission may be a mere acknowledgement from the passenger, passenger-in-waiting, or a remote computing system, like a teleoperator system, that assistance is available for manual control.

At operation 506, the process includes receiving a command to move in the unmapped region. For example, the command may include a direction of desired travel in the unmapped region, a speed to travel, an acceleration, and/or other information. In the context of FIG. 1, the process may receive manual or remote controlling instructions to proceed from the second location 116 toward the destination 120. the operation 504 may be substantially the same as the operation 422 described above. For example, once permission is received at 504, commands from a remote- or manual-control source may override normal operations of the vehicle.

At operation 508, the process may determine a safety region proximate the vehicle. For example, when the vehicle proceeds through the unmapped region, and particularly when the vehicle is under manual control, it may be desirable to reduce a likelihood of the vehicle contacting objects in the unmapped region. For example, the safety region may be one or more distances proximate the vehicle within which sensed objects may impact (or prohibit) travel, for example. Methods of determining one or more safety regions and remote controlling of a vehicle, such as an autonomous vehicle, are detailed further in U.S. patent application Ser. No. 15/833,695, filed Dec. 6, 2017, the entire disclosure of which is hereby incorporated by reference. As non-limiting examples, such control may be limited by velocity (e.g. under 5 mph in any direction) and provide rudimentary obstacle avoidance and safety features relying on a subset of sensors available to the vehicle (e.g. only RADAR, only time of flight, or any other combination of sensors).

At operation 510, the process senses an object in the unmapped region. For example, as the vehicle is travelling in the unmapped region, sensors on the vehicle may be used to detect objects in the environment. For example, some subset of all of the sensors, e.g., time of flight, radar, etc., on the vehicle may be used to detect a presence of objects in the unmapped region 122. Objects may include any potential or actual obstructions, including but not limited to people, animals, structures, or the like, or may include other features of the environment. For example, an object may be a ground surface that is a non-drivable surface, such as a lawn, sidewalk, stairs, curb, or the like.

At operation 512, the process determines whether the sensed object is in the safety region. If it is determined that the object is not in the safety region, e.g., because the object is too far away from the vehicle, the process proceeds to operation 514.

At operation 514, the process controls the vehicle to move in the unmapped region according to the command received at 506. For example, if no objects are in the safety region, it may be determined that the command is safe to execute, and the vehicle may proceed according to the command.

If it is determined at 512 that the sensed object is in the safety region, e.g., because the object is close to the vehicle, the process proceeds to operation 516.

At operation 516, the process determines an alternate command. For example, if the object is in a first safety region adjacent the vehicle, the command to move the vehicle may be ignored and the vehicle may remain stationary (or be stopped substantially immediately), e.g., to avoid contacting the object. In other examples, the object may be in a second region spaced from the vehicle, and the controls may be altered to proceed at a slower speed than an instructed or commanded speed. For instance, control signals received from a remote or manual controller may be altered to reduce a commanded velocity of the vehicle, e.g., depending upon a proximity of the object to the vehicle. Such velocity may be altered as a function of the proximity, either linearly, or otherwise (exponentially, etc.).

At operation 518, the process controls the vehicle according to the alternate command. Thus, if an object is too close to the vehicle, the command to navigate in the unmapped region may be ignored. Alternatively, if the altered command is to proceed as instructed, but at a reduced speed, the vehicle may proceed at the reduced speed.

In at least some examples, a subset of the sensors (e.g. a single sensor, or any number of sensors including all of the sensors) may continue to collect data, whether controlled according to operation 514 or operation 518. In such examples, data collected from the sensors may be used to augment the map data such that future requests to travel to the destination can rely on the augmented map data. For example, as discussed above with reference to FIG. 2, LiDAR sensors and/or vision sensors (e.g., cameras) may collect data in the unmapped region, which data may be used to construct a three-dimensional representation of the unmapped region, including physical features of the area, e.g., drivable surfaces, undrivable surfaces, buildings, trees, and/or the like.

Thus, the techniques described herein can facilitate safe and effective movement of autonomous vehicles in unmapped regions, as discussed herein.

EXAMPLE CLAUSES

A: An example vehicle includes: a first sensor disposed on the vehicle and configured to sense objects in an environment of the vehicle, the first sensor being of a first sensor type; a second sensor disposed on the vehicle and configured to sense the objects in the environment of the vehicle, the second sensor being of a second sensor type different from the first sensor type; one or more processors; and memory storing processor-executable instructions that, when executed by the one or more processors, configure the vehicle to: receive a first command to navigate to a destination; access map data comprising information about a mapped region between a current location of the vehicle and a first location associated with the destination; determine that the first location is outside the mapped region; determine a second position inside the mapped region and proximate the first location; receive first sensor data from the first sensor; receive second sensor data from the second sensor; based at least in part on the first sensor data and the second sensor data, control a drive system to move the vehicle to the second location; at least in part in response to the vehicle moving to the second location, allow manual control of the vehicle; receive a second command comprising a manual control signal to navigate from the second location to the first location; based at least in part on the second command and the first sensor data, control the drive system to move to the second location; and collect, using the second sensor, map data to for an area outside the mapped region B: The vehicle of example A, wherein the first sensor is a time of flight sensor and the second sensor is one of a light detection and ranging (LiDAR) sensor, a radio detection and ranging (RADAR) sensor, a sound navigation and ranging (SONAR) sensor, or a depth sensing camera.

C: The vehicle of example A or example B, wherein the second command is received from at least one of a teleoperator, a client device, or a user interface in the vehicle.

D: The vehicle of any one of example A through example C, the memory storing further processor-executable instructions that, when executed by the one or more processors, further configure the vehicle to: determine that the first sensor data is indicative of an object proximate the vehicle; determine at least one of a distance of the object from the vehicle or a position of the object relative to the vehicle; and generate, based at least in part on the manual control signal and the at least one of the distance or the position, a vehicle control signal, wherein the drive system is controlled to move to the second location based at least in part on the vehicle control signal.

E: An example method of controlling a vehicle includes: receiving a request to navigate the vehicle to a destination; accessing map data comprising information about a mapped region between a current location of the vehicle and a first location associated with the destination; determining that the first location is outside the mapped region; receiving first sensor data from a first sensor disposed on the vehicle and second sensor data from a second sensor disposed on the vehicle; causing, based at least in part on the first sensor data and the second sensor data, the vehicle to move to a second location in the mapped region and proximate the first location; receiving a control command for the vehicle to proceed from the second location toward the first location; based at least in part on the control command, moving the vehicle from the second location toward the first location; and collecting, based at least in part on at least one of the first sensor data or the second sensor data, additional map data about an unmapped region proximate the destination.

F: The method of example E, further comprising: wherein the moving the vehicle from the second location toward the second location is exclusive of at least one of the first sensor data or the second sensor data.

G: The method of example E or example F, wherein the receiving the control command comprises receiving the control command from a first user device associated with a passenger of the vehicle, from a second user device associated with a passenger-in-waiting at the destination, or from a teleoperator computing device in communication with the vehicle.

H: The method of any one of example E through example G, further comprising: determining, from the second sensor data, a distance of an object from the vehicle; and determining, based at least in part on the distance, a threshold speed, wherein causing the vehicle to move from the second location to the first location comprises moving the vehicle from the second location to the first location at or below the threshold speed.

I: The method of any one of example E through example H, wherein the first sensor is one of a light detection and ranging (LiDAR) sensor, a radio detection and ranging (RADAR) sensor, a sound navigation and ranging (SONAR)

sensor, or a depth sensing camera and the second sensor comprises a time of flight sensor.

J: The method of any one of example E through example I, further comprising: generating updated map data comprising the map data and the additional map data, the updated map data being configured to map the unmapped region.

K: The method of any one of example E through example J, further comprising: sending, at least in part in response to arriving at or proximate the second location, a signal requesting the control command, wherein receiving the control command comprises receiving the control command from a teleoperations system.

L: The method of any one of example E through example K, wherein: the control command comprises one or more of a speed, a direction, or an acceleration.

M: The method of any one of example E through example L, further comprising: receiving a subsequent request to navigate to the destination; receiving, from the sensor, additional sensor data; and causing, based at least in part on the additional sensor data and the updated map, the vehicle to move to the destination.

N: An example vehicle includes: a first sensor disposed on the autonomous vehicle and configured to sense an environment proximate the autonomous vehicle a second sensor disposed on the autonomous vehicle and configured to sense the environment; one or more processors; and memory storing processor-executable instructions that, when executed by the one or more processors, configure the vehicle to: receive a request to navigate to a destination; access map data comprising information about a mapped region between a current location of the vehicle and a first location associated with the destination; determine that the first location is in an unmapped region adjacent the mapped region; receive first sensor data from the first sensor and second sensor data from the second sensor; control, based at least in part on the first sensor data and the second sensor data, the autonomous vehicle to move to a second location proximate a boundary between the mapped region and the unmapped region; receive a control command to navigate from the second location toward the first location in the unmapped region; control, based at least in part on the control command the autonomous vehicle to move from the second location to the first location; and collect, based at least in part on at least one of the first sensor data or the second sensor data, additional map data about the unmapped region.

O: The autonomous vehicle of example N, the memory storing further processor-executable instructions that, when executed by the one or more processors, configure the vehicle to: send, based at least in part on approaching the second location and to a teleoperator, a request for the second control command; and transmit at least a portion of the sensor data to the teleoperator; wherein the control command is received from the teleoperator at least in part in response to the request.

P: The autonomous vehicle of example N or example O, wherein the control command is received from one or more of a user interface in the autonomous vehicle or a user device.

Q: The autonomous vehicle of any one of example N through example P, wherein: the control command is configured to cause the vehicle to move in a direction at an input speed, and the memory stores further processor-executable instructions that, when executed by the one or more processors, configure the vehicle to: determine, based at least in part on the second sensor data, a distance of an object from the vehicle; and determine, based at least in part on the distance being less than or equal to a threshold distance, an altered control command, wherein controlling the drive module to move the vehicle from the second location to the first location comprises moving the vehicle from the second location to the first location based at least in part on the altered control command.

R: The autonomous vehicle of any one of example N through example Q, wherein the altered control command comprises a reduced speed relative to the input speed and the reduced speed is determined as a linear function of the distance.

S: The autonomous vehicle of any one of example N through example R, wherein the first sensor comprises one of a light detection and ranging (LiDAR) sensor, a radio detection and ranging (RADAR) sensor, a sound navigation and ranging (SONAR) sensor, or a depth sensing camera, and the second sensor comprises a time of flight sensor.

T: The autonomous vehicle of any one of example N through example S, the memory storing further processor-executable instructions that, when executed by the one or more processors, configure the vehicle to: generate updated map data comprising the map data and the additional map data, the updated map data being configured to map the unmapped region.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations described herein need not be performed in the order disclosed, and other examples using alternative orderings of the computations could be readily implemented. In addition to being reordered, in some instances, the computations could also be decomposed into sub-computations with the same results.

What is claimed is:

1. A method of controlling a vehicle from a current location in a mapped region to a destination in an unmapped region, comprising:
   receiving a request to navigate the vehicle to the destination including a structure;
   accessing map data comprising information about the mapped region, the vehicle being configured to drive autonomously in the current location of the mapped region using the map data;
   determining that the destination is a location in the unmapped region which is bordered by the mapped region;
   determining, based at least in part on the destination being the location in the unmapped region, a second location in the mapped region that is proximate and nearer the destination than the current location in the mapped region;

receiving first sensor data from a first sensor disposed on the vehicle and second sensor data from a second sensor disposed on the vehicle;

determining, based at least in part on the first sensor data and the second sensor data, a first control command for causing the vehicle to move to the second location;

based at least in part on the first control command, autonomously controlling a drive system of the vehicle from the current location to the second location within the mapped region;

receiving a second control command for the vehicle to proceed from the second location in the mapped region toward the destination in the unmapped region, the second control command comprising a manual control command to navigate from the second location to the destination;

based at least in part on the second control command, switching from the autonomous control to a manual control of the drive system of the vehicle to move from the second location toward the destination; and collecting, based at least in part on at least one of the first sensor data or the second sensor data, additional map data about an unmapped region proximate the destination.

2. The method of claim 1, wherein the moving the vehicle from the second location toward the destination is in an absence of at least one of the first sensor data or the second sensor data.

3. The method of claim 1, wherein the receiving the request comprises receiving the request from a first user device associated with a passenger of the vehicle, from a second user device associated with a passenger-in-waiting at the destination, or from a teleoperator computing device in communication with the vehicle.

4. The method of claim 1, further comprising:

determining, from the second sensor data, a distance of an object from the vehicle; and determining, based at least in part on the distance, a threshold speed, wherein the moving from the second location to the destination comprises moving the vehicle from the second location to the destination at or below the threshold speed.

5. The method of claim 4, wherein the first sensor is one of a light detection and ranging (LiDAR) sensor, a radio detection and ranging (RADAR) sensor, a sound navigation and ranging (SONAR) sensor, or a depth sensing camera and the second sensor comprises a time of flight sensor.

6. The method of claim 1, further comprising:

generating updated map data comprising the map data and the additional map data, the updated map data being configured to map the unmapped region.

7. The method of claim 1, further comprising:

sending, at least in part in response to arriving at or proximate the second location, a signal requesting the second control command, wherein the second control command is received from a teleoperations system.

8. The method of claim 1, wherein the second control command comprises one or more of a speed, a direction, or an acceleration.

9. The method of claim 6, further comprising:

receiving a subsequent request to navigate to the destination;

receiving, from the first sensor or the second sensor, additional sensor data; and causing, based at least in part on the additional sensor data and the updated map data, the vehicle to move to the destination.

* * * * *